Nov. 5, 1957

R. P. ATKINSON 2,812,196

PISTON RING TURBINE SHAFT SEAL

Filed May 20, 1954

INVENTOR
Robert P. Atkinson
BY
Paul Fitzpatrick
ATTORNEY

United States Patent Office 2,812,196
Patented Nov. 5, 1957

1

2,812,196

PISTON RING TURBINE SHAFT SEAL

Robert P. Atkinson, Indianapolis, Ind., assignor to General Motors Corporation, Detroit, Mich., a corporation of Delaware Application May 20, 1954, Serial No. 431,233

2 Claims. (Cl. 286—7)

This invention relates to ring seals and more particularly to a ring seal for use between two relatively rotatable members.

An object of this invention is to provide a split ring seal for use between two relatively rotatable members. Another object of this invention is to provide a split ring seal particularly designed for use in shaft and housing installations where lubrication is needed in one portion of the installation, but it is desired to maintain another portion of the installation relatively free of lubricant. A further object of this invention is to provide a split ring seal for use between a housing and a rotatable shaft positioned within the housing wherein the ring seal acts as a barrier to the flow of lubricant between the members from a lubricant receiving portion of the installation to a portion of the installation relatively free of lubricant. Still another object of this invention is to provide a split ring seal which will act as a barrier to the flow of lubricant between a housing and a shaft and will also effectively serve to return any excess lubricant from a relatively dry portion of the installation to a lubricant receiving portion of the installation.

The problem of lubricant flow is particularly evident in gas turbines and compressors wherein lubricant is supplied to the bearing units supporting the rotatable shaft. If the lubricant is allowed to flow between the shaft and housing into the turbine or compressor chamber, it will either be carbonized or will collect dust and other foreign matter therein which will result in interference with normal and effective operation of the turbine or compressor.

Still a further object of this invention is to provide an improved split ring seal which is easily produced and installed and provides effective sealing over long periods of time without replacement.

These and other objects of this invention will be readily apparent from the following specification and drawing wherein.

Figure 1:
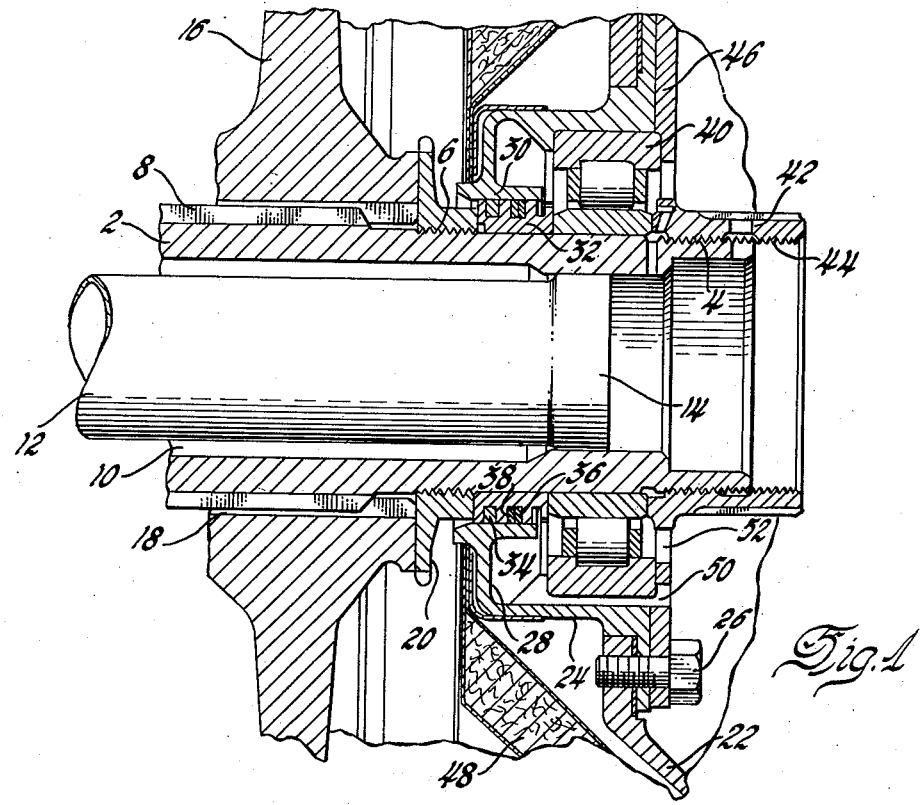
Figure 1 is a cross-sectional view of a turbine shaft bearing with the ring seal installed between the shaft and the housing.

Referring particularly to Figure 1, 2 is a shaft having threaded portions 4 and 6, a splined portion 8, and an internal bore 10. A heat shield tube 12 is mounted within the bore 10 of the shaft 2 and is fixed in place by expanding the end thereof as at 14. A turbine wheel 16 is mounted on shaft 2 by a splined bore 18 cooperating with the splined portion 8 of the shaft. A nut 20 retains turbine wheel 16 and a number of other similar wheels on shaft 2 as is well known in the art.

A frame member 22 is fixedly mounted on the stator frame and a bearing retainer 24 is attached to frame member 22 by bolts 26. The bearing retainer 24 has a web portion 28 and a cylindrical flange portion 30. A sleeve 32 on shaft 2 is provided with spaced annular grooves for split sealing rings 34, 36 and 38. A roller bearing 40 mounted in the bearing retainer 24 supports shaft 2. It is retained on the shaft by nut 42 having a threaded portion 44 cooperating with threaded portion 4 of shaft 2. A retaining ring 46 is mounted on frame member 22 by bolts 26 and holds bearing 40 within bearing retainer 24. A heat shield 48 is also provided. Although a rear or exhaust end turbine bearing installation has been described, the front bearing installation will be structurally similar and, therefore, the split sealing rings may be used equally as well in either a front or a rear turbine bearing installation.

The retaining ring 46 is provided with a drain opening 50 and is spaced from nut 42 to provide an annular opening 52. Lubricant for bearing 40 is sprayed in through annular opening 52 and after the lubricant has worked its way through bearing 40, it returns to the sump through opening 50. A complete description of a suitable lubrication system for a turbine will be found in the co-pending application of John B. Wheatley, filed March 20, 1951, Serial No. 216,555, assigned to the assignee of the present invention. As the lubricant circulates through and around bearing 40, it will tend to enter the running clearance between cylindrical flange 30 and shaft sleeve 32. It is very undesirable to allow the lubricant to flow into the turbine or compressor chamber where it will either be carbonized or collect dust and other foreign matter. Therefore, split sealing rings 34, 36 and 38 are provided to prevent the lubricant from flowing through the running clearance between members 30 and 32 into the turbine or compressor chamber. The running clearance may be from 0.010 to 0.015 inch and no lubricant film is required between members 30 and 32.

The present invention provides a seal between these members which will return excess lubricant from the relatively dry side of the seal to the lubricant side of the seal. In Figure 1, the relatively dry side of the seal will be that to the left-hand side of rings 36 and 38 and the lubricant side of the seal will be to the right-hand side of rings 36 and 38.

Figure 2:
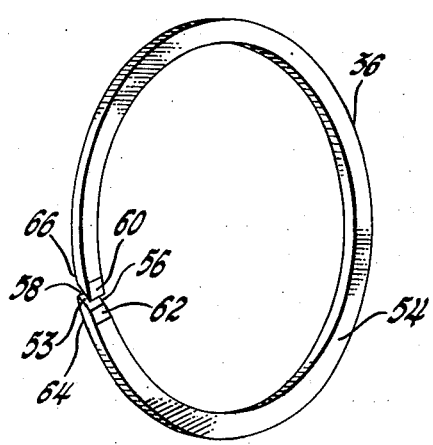
Figure 2 is a view of the split ring seal.
Figure 3:
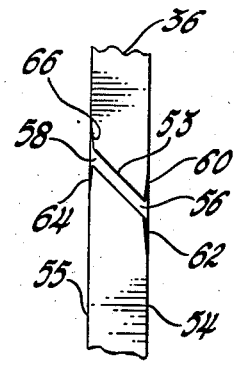
Figure 3 is an enlarged view of the ends of the seal forming the gap.

In Figure 2, a sealing ring 36 is shown as having a rectangular cross section and as being split at one point to form a gap 53. Sealing rings 34 and 38 are similar and after the sealing rings are fitted within the annular grooves in sleeve 32, they spring outwardly against cylindrical flange 30 to be fixedly held as shaft 20 and sleeve 32 rotate. As can be seen in Figure 3, gap 53 formed by the ends of the ring, is angular to the sides 54 and 55 of the ring, this angle preferably being 45°. The gap also lies in a plane angular to the axis of the ring, the angle being the same, and after ring 36 and rings 34 and 38 are fitted within the annular grooves in sleeve 32, the gap in each ring will lie in a plane angular to the axis of rotation of shaft 2, the angle still remaining the same. Although an angle of 45° is preferred, other angles may also be used. Each end of the ring forming the gap is chamfered as at 60 and 66, and 62 and 64, this chamfer preferably being 3° with respect to the sides 54 and 55 of the ring. Gap 53 has an opening 56 on side 54 of the ring and an opening 58 on side 55 of the ring. The rings 34, 36 and 38 are fitted within the annular grooves in sleeve 32 with their gaps inclined toward the lubricant side of the ring in the direction of rotation of the sleeve. Gap 53, as shown in Figure 3, will remain inclined in the same direction after ring 36 has been fitted within the annular groove in sleeve 32, if shaft 2 rotates counterclockwise as viewed from the right-hand side of Figure 1. Thus, opening 56 will be the trailing opening and will be on the lubricant receiving side of ring 36 and opening 58 will be the leading opening and will be on the relatively dry side of the ring.

As shaft 2 rotates counterclockwise as viewed from the right-hand side of Figure 1, the leading opening 58 will become filled with excess lubricant scraped from the side wall of the groove on the relatively dry side 55 of the ring by the ends of the ring. This lubricant will be accumulated in gap 53 and will flow through the gap to trailing opening 56 where it will be picked up by the flow of lubricant past this opening. The ends of the ring on the lubricant receiving side 54 also scrape excess lubricant from the side wall of the groove on the lubricant receiving side of the ring. This lubricant is also picked up by the flow of lubricant past trailing opening 56. The flow of lubricant past opening 56 is caused by the rotation of shaft 2 and sleeve 32 within cylindrical flange 30, and it can be seen that in order for the lubricant flowing past opening 56 to enter gap 53, it will have to reverse its direction and flow backwardly with respect to the direction of rotation of the shaft. Therefore, by placing gap 53 in such a position that it is inclined in the direction of rotation of the shaft, none of the lubricant will flow into the opening 56 of the gap 53 and thence to the relatively dry side of the ring. The ends of the ring are chamfered at 60 and 66, and 62 and 64, in order to ensure that a lubricant film will remain between sides 54 and 55 of the ring and the side walls of the groove. The lubricant film prevents scoring of the side walls of the annular grooves as shaft 2 and sleeve 32 rotate. The chamfering also avoids any sharp edges which might also score the side walls of the grooves or remove the bearing metal layer with which the grooves are sometimes coated.

Although the invention has been described in terms of a single sealing ring, as ring 36, being used in the annular groove of the shaft sleeve 32, a pair of sealing rings 36 and 38 in back-to-back relationship is also shown in Figure 1. The operation of the rings will be the same in either case. If a pair of sealing rings is used, the gaps 53 in each ring are inclined toward the lubricant receiving side of the shaft and housing in the direction of rotation of the shaft. However, the gaps are not aligned, and each ring will function separately as hereinbefore described.

Thus, this invention not only provides an effective sealing ring for use between a stationary housing and a shaft, but also provides a ring designed to collect excess lubricant from a relatively dry side of the housing and shaft and cause this lubricant to flow to the lubricant receiving side of the housing and shaft.

Although the split sealing ring has been shown in a rear turbine bearing installation, it will be readily apparent that the ring has a wide range of use in any installation where lubricant is circulated on one side of the ring, but it is desired to maintain the other side of the ring in a relatively dry state. Such a ring may be used in conjunction with shafts and housings wherein it is desired to lubricate the bearing means for the shaft within the housing, but it is desired to prevent the lubricant from flowing into a chamber within the housing or formed by the housing.

The embodiment of the invention shown and described is merely illustrative of the principles of the invention, which may be embodied in various structures within the scope and spirit of the invention.

I claim:

1. A seal comprising, in combination, a stationary housing, a rotatable member positioned within said housing and provided with at least one annular groove, lubricating means for said housing and said member, and a split ring fitting within said groove and bearing against said housing to be fixedly held thereby, said ring dividing said housing into a lubricant receiving portion and a relatively dry portion with the ends of said ring forming a gap inclined toward the lubricant receiving side of said housing in the direction of rotation of said rotatable member, whereby during rotation of said member said ends will scrape excess lubricant from the wall of said groove on the relatively dry side of said ring and pass it into the gap formed by the ends of said ring, said end faces of said ring adjacent the side wall of said groove on the relatively dry side of said ring being chamfered to leave a lubricant film between said ring and said side wall.

2. A seal comprising, in combination, a stationary housing, a rotatable member positioned within said housing and provided with an annular groove, lubricating means for said housing and rotatable member, and a pair of split rings fitting within said groove and bearing against said housing to be fixedly held thereby and divide said housing into a lubricant receiving portion and a relatively dry portion, the ends of said rings forming gaps inclined toward the lubricant receiving portion of said housing in the direction of rotation of said rotatable member and being misaligned with respect to each other, whereby during rotation of said rotatable member one of said rings will scrape excess lubricant from the wall of said groove on the relatively dry side of said rings and pass it into the gap formed by the ends of said one ring, said gap in the other of said rings receiving said excess lubricant from between said rings and passing it to the lubricant receiving side of said rings, the end faces of said one ring adjacent the side wall of said groove on the relatively dry side of said ring being chamfered to leave a lubricant film between said ring and said side wall and the other end faces of said one ring and the adjacent faces of said other ring being chamfered to leave a lubricant film between said rings.

References Cited in the file of this patent

UNITED STATES PATENTS

| 719,101 | Folant | Jan. 27, 1903 |
| 1,895,167 | Lighthall | Jan. 24, 1933 |

FOREIGN PATENTS

| 293,567 | Great Britain | July 12, 1928 |